United States Patent [19]

Ikeuchi et al.

[11] Patent Number: 4,943,717

[45] Date of Patent: Jul. 24, 1990

[54] ANGLE MEASURING DEVICE HAVING SPECIFIC SIGNAL PROCESSING ARRANGEMENT

[75] Inventors: Masayuki Ikeuchi; Kouichi Okamura, both of Himeji, Japan

[73] Assignee: Mitsubishi Denki Kabushiki Kaisha, Tokyo, Japan

[21] Appl. No.: 413,644

[22] Filed: Sep. 28, 1989

[51] Int. Cl.$^5$ .............................................. G01D 5/34
[52] U.S. Cl. ......................... 250/231.17; 250/237 G
[58] Field of Search .......... 250/231 SE, 237 G, 211 J; 341/13

[56] References Cited

U.S. PATENT DOCUMENTS

| | | | |
|---|---|---|---|
| 3,999,064 | 12/1976 | Kramer | 250/231 S E |
| 4,253,021 | 2/1981 | Ernst | 250/237 G |
| 4,634,859 | 1/1987 | Martel | 341/13 |
| 4,766,307 | 8/1988 | Pelgrom et al. | 250/211 J |
| 4,893,007 | 1/1990 | Stannow et al. | 250/231 S E |

FOREIGN PATENT DOCUMENTS 61-219830  9/1986  Japan .

*Primary Examiner*—David C. Nelms
*Assistant Examiner*—Stephone B. Allen
*Attorney, Agent, or Firm*—Sughrue, Mion, Zinn, Macpeak & Seas

[57] ABSTRACT

An angle measuring device for measuring the turning angle of a crankshaft in an internal combustion engine in order to control, for example, the ignition timing thereof comprises: a rotating disc which is adapted to rotate in synchronization with a crankshaft and which has a plurality of slits formed along the circumference thereof; light-emitting elements arranged in the vicinity of the rotating disc; light-receiving elements adapted to receive light emitted from the light-emitting elements through the slits of the rotating disc; and a signal processing circuit adapted to process signals output from the light-receiving elements and including: a semiconductor substrate, a plurality of islands formed on the surface of the semiconductor substrate from diffusion layers, a protective-resistor element formed in one of the islands and connected to the light-emitting means, and separation layers separating the island on which the protective-resistor element is formed from the other islands, no other elements being formed on the island on which the protective-resistor element is formed.

4 Claims, 3 Drawing Sheets

ANGLE MEASURING DEVICE HAVING SPECIFIC SIGNAL PROCESSING ARRANGEMENT

BACKGROUND OF THE INVENTION

1. Field of the Invention

This invention relates to an angle measuring device, and in particular to an angle measuring device for measuring the turning angle of a crankshaft in an internal combustion engine in order to control the ignition timing, etc. thereof.

2. Description of the Related Art

In order to control the ignition timing, etc. of an internal combustion engine, an angle measuring device is used which is adapted to emit a predetermined pulse in synchronization with rotations of the crankshaft of the engine. FIG. 1 shows an example of conventional devices of this type. The device shown comprises a shaft 1 which rotates in synchronization with the rotation of the crankshaft (not shown), a rotating disc 2 attached to the shaft 1, light-emitting elements 3 and 4, light-receiving elements 5 and 6, and an electronic circuit 7 including a semiconductor signal-processing circuit.

FIG. 2 is a plan view of the rotating disc 2 of FIG. 1. As shown in the drawing, a plurality of slits 8a and 8b are provided at predetermined intervals along the circumference of the rotating disc 2, respectively.

FIG. 3 is a structural drawing of the semiconductor signal-processing circuit in the electronic circuit 7 of FIG. 1. The semiconductor signal-processing circuit shown comprises a wiring layer 9 made of aluminum, an input terminal 10, a P-type resistor layer 11 constituting a protective resistor connected to the input terminal 10, an N+ layer 12 connected to a circuit power-source terminal 13, a P-type resistor layer 14 constituting another resistor, N-type diffusion layers 15 forming islands, separation layers 16 which separate adjacent diffusion layers 15 from each other, and a P-type substrate 17, one end of which is grounded.

In this conventional angle measuring device, which has the construction described above, the rotating disc 2 shown in FIG. 2 rotates by being driven by the shaft 1, in synchronization with the rotation of the associated crankshaft. Light is input to the light-receiving elements 5 and 6 and causes them to emit signals only when slits 8a and 8b are positioned between them and the light-emitting elements 3, 4. These signals are applied to the input terminal 10 shown in FIG. 3 so that they may be processed. However, as shown in FIG. 3, the resistor layer 11 constituting a protective resistor and the other resistor layer 14 constituting a different element such as a resistor are provided in the same diffusion island 15, so that, when an input voltage which is higher than that of the circuit power source is applied to the input terminal 10, the first P-type resistor layer 11, the N-type layer 12 and the second P-type resistor layer 14 form a parasitic PNP transistor, which causes a base electric current as indicated by the solid arrow and a collector electric current as indicated by the dashed arrow to flow. Thus, electric currents are allowed to flow into other circuits, resulting in the device being subject to malfunction.

SUMMARY OF THE INVENTION

The present invention has been contrived with a view to eliminating this problem. It is accordingly an object of this invention to provide an angle measuring device which is capable of preventing malfunctions attributable to parasitic transistors.

In accordance with this invention, there is provided an angle measuring device comprising:

a rotating disc which is adapted to rotate in synchronization with the rotation of a crankshaft and which has a plurality of slits formed along the circumference thereof;

a light-emitting means arranged in the vicinity of the above-mentioned rotating disc;

a light-receiving means adapted to receive light emitted from the above-mentioned light-emitting means through the slits of the above-mentioned rotating disc; and a signal processing circuit adapted to process signals output from the above-mentioned light-receiving means and including: a semiconductor substrate, a plurality of islands formed on the surface of the above-mentioned semiconductor substrate from diffusion layers, a protective-resistor element formed in one of the above-mentioned islands and connected to the above-mentioned light-emitting means, and separation layers separating the island on which the above-mentioned protective-resistor element is formed from the other islands, no other elements being formed on the island on which the above-mentioned protective-resistor element is formed.

DESCRIPTION OF THE PREFERRED EMBODIMENTS

An embodiment of this invention will now be described with reference to the accompanying drawings.

Figure 1:
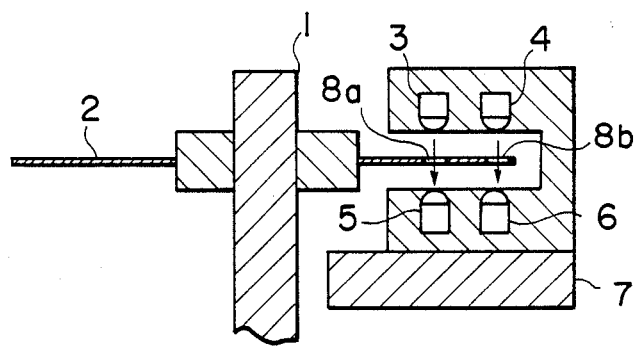
FIG. 1 is a schematic view of a conventional angle measuring device.
Figure 2:
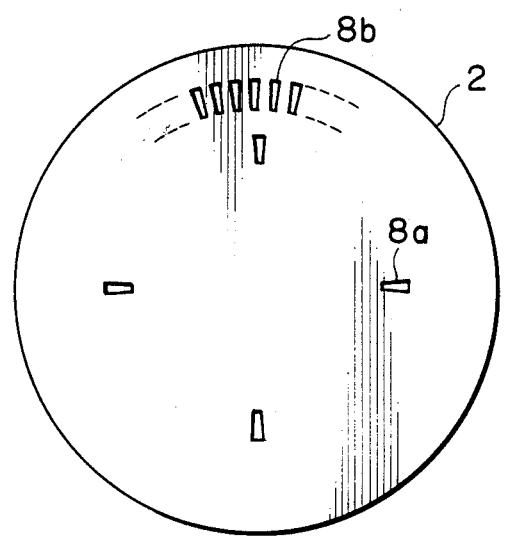
FIG. 2 is a plan view of the rotating disc used in the device shown in FIG. 1.
Figure 3:
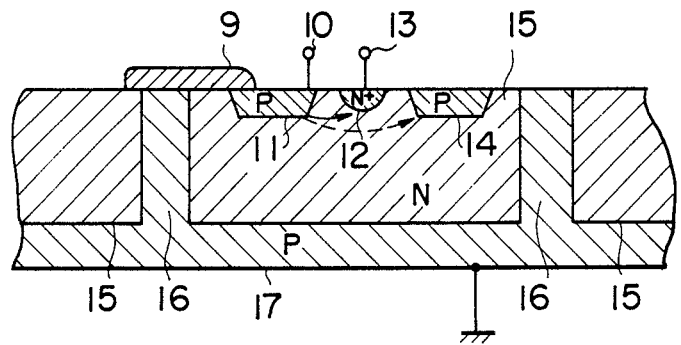
FIG. 3 is a sectional view of the signal processing circuit used in the device shown in FIG. 1.
Figure 4:
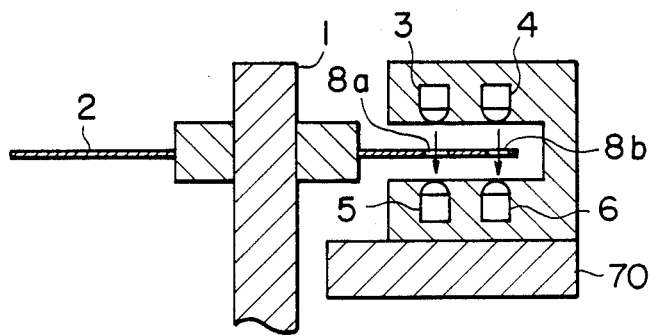
FIG. 4 is a schematic view of an angle measuring device in accordance with an embodiment of this invention.

Referring to FIG. 4, the embodiment shown includes a shaft 1 which rotates in synchronization with the crankshaft (not shown) of an internal combustion engine. Attached to this shaft 1 is a rotating disc 2 which, as shown in FIG. 2, has a plurality of slits 8a and 8b that are arranged at predetermined intervals along the circumference thereof, respectively. Light-emitting elements 3, 4 and light-receiving elements 5, 6 are arranged in such a manner that this rotating disc 2 is positioned between them, an electronic circuit 70 being electrically connected to these elements 3 to 6.

During operation, voltage is applied to the light-emitting elements 3 and 4 by the electronic circuit 70 so as to cause light to be emitted from these light-emitting elements 3 and 4, and the rotating disc 2 is rotated by the shaft 1 in synchronization with the crankshaft (not shown). Only when the slits 8a and 8b come, as a result of the rotation of the rotating disc 2, between the light-emitting and light-receiving elements 3 and 5, and, 4 and 6, respectively, the light emitted from the light-emitting elements 3 and 4 is input through the slits 8a and 8b to the light-receiving elements 5 and 6, thereby causing the light-receiving elements 5 and 6 to output electrical signals to the electronic circuit 70.

Figure 5:
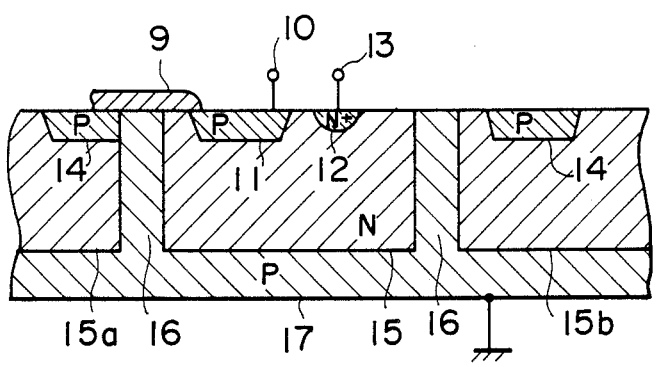
FIG. 5 is a sectional view of the signal processing circuit used in the embodiment of FIG. 4.

A signal processing circuit as shown in FIG. 5 is formed in the electronic circuit 70. This signal processing circuit includes a P-type substrate 17, one end of which is grounded. Formed on this P-type substrate 17 are diffusion layers 15, 15a, 15b, . . . each forming an N-type island. Adjacent diffusion layers are separated from each other by respective separation layers 16. Formed on the surface of one of these diffusion layers 15 are a P-type resistor layer 11 connected to an input terminal 10 and constituting a protective resistor element, and an N+ layer 12 connected to a circuit power-source terminal 13. Formed on the surfaces of the other diffusion layers 15a and 15b are P-type resistor layers 14 for forming various elements. Thus, in this signal processing circuit, the separation layers 16 separate the diffusion layer 15 on which the resistor layer 11 connected to the input terminal 10 is formed from the diffusion layers 15a and 15b on which other elements are formed. The reference numeral 9 indicates a wiring layer which is made of aluminum. The respective output terminals of the light-receiving elements 5 and 6 are connected to the input terminal 10.

The electrical signals output from the light-receiving element 5 or 6 are input through the input terminal 10 to the signal processing circuit, where they are processed to allow the turning angle of the rotating disc 2 to be measured. Since no other elements are formed in the diffusion layer 15 through which the resistor layer 11 is connected to the input terminal 10, no parasitic transistor such as those formed in conventional devices are formed therein. Accordingly, even when an input voltage higher than that of the circuit power source is applied to the input terminal 10, the electric currents flow through the separation layers 16 and the substrate 17 to the ground. This helps to prevent malfunctions attributable to parasitic transistors as well as those attributable to superimposed noise due, for example, to the wiring layer 9.

What is claimed is:

1. A angle measuring device comprising:
   a rotating disc which is adapted to rotate in synchronization with a crankshaft and which has a plurality of slits formed along the circumference thereof;
   a light-emitting means arranged in the vicinity of said rotating disc;
   a light-receiving means adapted to receive light emitted from said light-emitting means through the slits of said rotating disc; and
   a signal processing circuit adapted to process signals output from said light-receiving means and including: a semiconductor substrate, a plurality of islands formed on the surface of said semiconductor substrate from diffusion layers, a protective-resistor element formed in one of said islands and connected to said light-emitting means, and separation layers separating the island on which said protective-resistor element is formed from the other islands, no other elements being formed on the island on which said protective-resistor element is formed.

2. A device as claimed in claim 1, further comprising a power-source terminal connected to the island on which said protective-resistor element is formed and used for applying to this island the power-source voltage of said signal processing circuit.

3. A device as claimed in claim 1, further comprising elements other than said protective-resistor element which are formed on said other islands.

4. A device as claimed in claim 1, wherein said semiconductor substrate is grounded.

* * * * *